(12) United States Patent
McAuliffe et al.

(10) Patent No.: US 8,347,647 B2
(45) Date of Patent: Jan. 8, 2013

(54) AIR CYCLE MACHINE FOR AN AIRCRAFT ENVIRONMENTAL CONTROL SYSTEM

(75) Inventors: Christopher McAuliffe, Windsor, CT (US); Brent J. Merritt, Southwick, MA (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 2141 days.

(21) Appl. No.: 10/980,045

(22) Filed: Nov. 3, 2004

(65) Prior Publication Data
US 2006/0059942 A1 Mar. 23, 2006

Related U.S. Application Data

(60) Provisional application No. 60/611,941, filed on Sep. 22, 2004.

(51) Int. Cl.
*F25D 9/00* (2006.01)

(52) U.S. Cl. ............................................ 62/401; 62/402

(58) Field of Classification Search ............... 62/DIG. 5, 62/402, 401, 404, 411, 412, 41, 414, 86, 62/87, 88, 117, 172, 427, 434, 410; 454/71, 454/76; 60/39.183, 785; 165/235
See application file for complete search history.

(56) References Cited

U.S. PATENT DOCUMENTS

| | | | | |
|---|---|---|---|---|
| 4,419,926 A * | 12/1983 | Cronin et al. | ................... | 454/74 |
| 4,901,523 A * | 2/1990 | Huelster | .......................... | 60/791 |
| 5,014,518 A | 5/1991 | Thomson et al. | | |
| 5,125,597 A | 6/1992 | Coffinberry | | |
| 5,143,329 A | 9/1992 | Coffinberry | | |
| 5,207,078 A * | 5/1993 | Kimura et al. | .................. | 62/509 |
| 5,442,905 A | 8/1995 | Claeys et al. | | |
| 5,704,218 A | 1/1998 | Christians et al. | | |
| 5,784,894 A * | 7/1998 | Army et al. | ..................... | 62/402 |
| 5,937,668 A * | 8/1999 | Jun | ................................ | 62/290 |
| 5,984,198 A * | 11/1999 | Bennett et al. | ................ | 237/2 B |
| 6,151,909 A * | 11/2000 | Carter et al. | .................... | 62/402 |
| 6,305,156 B1 | 10/2001 | Lui | | |
| 6,457,318 B1 | 10/2002 | Lui et al. | | |
| 6,615,606 B2 * | 9/2003 | Zywiak | .......................... | 62/402 |
| 6,871,510 B2 * | 3/2005 | Haas | .............................. | 62/402 |

OTHER PUBLICATIONS

Search Report PCT/US2005/033924.
Extended European Search Report, mailed Apr. 15, 2011, EP Application No. 11156384.7.

* cited by examiner

*Primary Examiner* — Mohammad Ali
(74) *Attorney, Agent, or Firm* — Carlson, Gaskey & Olds PC

(57) ABSTRACT

An ECS system provides an ACM which locates the compressor upon a common shaft between a first turbine and a second turbine. Each RAF is located remote from the ACM such that the turbines are located outboard on each end of the ACM to provide the highest efficiency possible with each turbine using a straight axial outlet diffuser. As the compressor is located between the turbines the bypass circuits from the turbines are less circuitous and more efficient. Integral valve ports formed into the ACM housing portions results in a weight reduced design due to increase bypass efficiencies and simplified installations.

7 Claims, 3 Drawing Sheets

AIR CYCLE MACHINE FOR AN AIRCRAFT ENVIRONMENTAL CONTROL SYSTEM

REFERENCE TO RELATED APPLICATIONS

The present invention claims the benefit of U.S. Provisional Patent Application No. 60/611,941, filed Sep. 22, 2004.

BACKGROUND OF THE INVENTION

The present invention relates to environmental control systems (ECSs), and more particularly to an air cycle machine (ACM) configuration.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages. Interaction between the air and liquid subsystems is relatively complex. Moreover, airflow sequencing, particularly for multi-turbine air cycle machines (ACMs), radically affects ECS efficiency. In many instances much thermal energy may be wasted or otherwise inefficiently used.

In one conventional system, a flow of bleed air is taken from an intermediate or high pressure stage within a jet engine. The bleed air is pre-cooled within an air-to-air heat exchanger with heat being rejected to RAM air and then flowed to a compressor of the ACM. After compression, the air is routed through a second air-to-air heat exchanger, a regenerative heat exchanger and an air-to-air reheater heat exchanger. Condensed water vapor is extracted by a water extractor, and dehumidified air is routed to a turbine. Expanded air from the turbine flows through another water collector and into a liquid-to-air heat exchanger of the liquid loop. A relatively warmer liquid in the liquid loop which is used to cool the avionics is thereby cooled. From the liquid-to-air heat exchanger, the air passes through the reheater heat exchanger. The dehumidified air is then passed into a second turbine of the ACM where it is again expanded and passed through another liquid-to-air heat exchanger to further absorb heat from the liquid loop.

The ACM is an integral part of the ECS. Conventional ACMs include a rotative assembly surrounded by a static structure. Typically, conventional ACMs include two turbines, a compressor, and a fan. Conventional ACMs locate the two turbines, compressor, and fan on a single shaft. Due to the unique operation and installation requirements of the RAM system, the fan rotor is located on one outboard end of the ACM which may reduce the efficiency thereof. This may reduce the efficiency of the entire ECS system.

SUMMARY OF THE INVENTION

The ECS system according to one non-limiting embodiment of the present invention provides an ACM which locates the compressor upon a common shaft between a first turbine and a second turbine. The RAF is located remote from the ACM such that the turbines are located outboard on each end of the ACM. This outboard positioning results in the highest efficiency possible with each turbine using a straight axial outlet diffuser. As the compressor is located between the turbines the bypass circuits from the turbines are less circuitous and more efficient. Integral valve ports formed into the ACM housing portions results in a weight reduced design which increases bypass efficiencies and simplified installations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
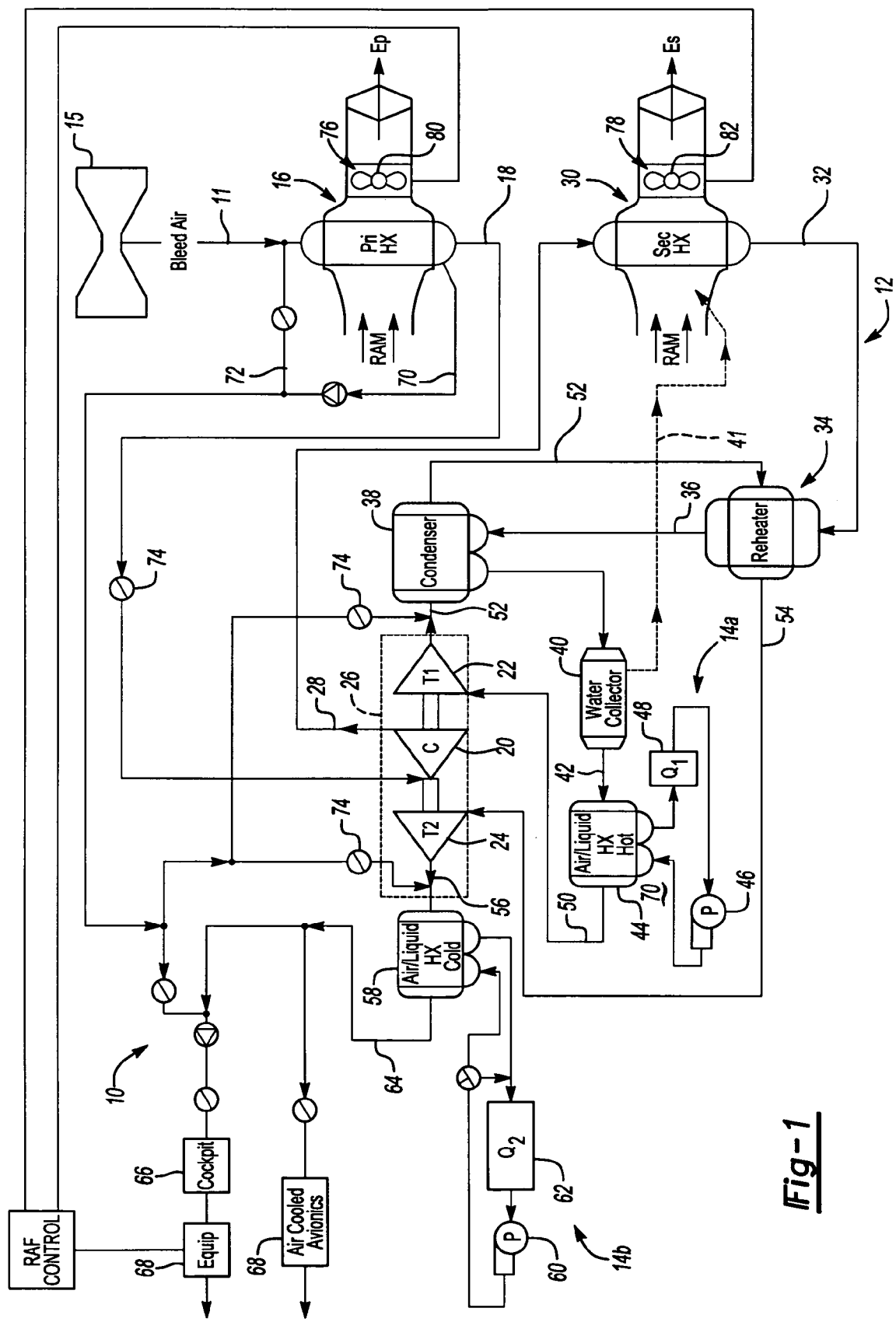
FIG. 1 is a schematic representation of environmental control system according to the present invention.

FIG. 1 illustrates a general schematic view of a liquid-to-air cycle system or environmental control system (ECS) 10. The ECS 10 includes an air cycle subsystem 12 that is in a heat exchange relationship with a liquid cycle subsystem 14a, 14b. It should be understood that although two separate liquid subsystems are disclosed in the illustrative embodiment, a single substantially continuous subsystem will also benefit from the present invention.

Bleed air 11 is received from a gas turbine engine (illustrated schematically at 15). The bleed air 11 is sent through a primary heat exchanger 16 such that the bleed air 11 is in heat exchange relationship with RAM or ambient air. The primary heat exchanger 16 is an air-to-air exchanger. After the bleed air 11 is cooled in the primary heat exchanger 16, the resulting cooler air is communicated through a passage 18 which communicates with a compressor 20 where the air is compressed to a high pressure. The compressor 20 is located upon a common shaft with a first turbine 22 and a second turbine 24. The compressor 20 and turbines 22, 24 define an air cycle machine (ACM) 26.

Compressed air exits the compressor 20 through a passage 28 which communicates with a secondary heat exchanger 30. The secondary heat exchanger 30 is an air-to-air exchanger which further cools the compressed air by heat exchange with a RAM air flow. Compressed, cooled and water vapor bearing air exits the secondary heat exchanger 30 and flows through a duct 32 which communicates with a reheater 34.

The reheater 34 further cools the water vapor bearing air which exits the reheater 34 through a passage 36. Passage 36 communicates with a condenser 38 which further cools the water vapor bearing air by condensing and separating the water into a water extractor 40. As the water vapor bearing air is passed directly from the reheater 34 to the condenser 38, the water from the water vapor condenses relatively easily.

Dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, moisture which may remain in the air is removed as the temperature of the air is increased by passage through the first air-liquid heat exchanger 44.

The liquid cycle subsystem 14a, is a closed system and utilizes a liquid coolant, such as polyalphaolephin (PAO) which is cycled by a pump 46 or the like. The liquid coolant functions as a coolant medium for a heat load 48 and as a heat source for the dehumidified air which is passing through passage 42. The heat load 48 is typically an avionics subsystem which generates a rather large amount of heat--typically around 160 degrees Fahrenheit. The heat exchange process therein between the liquid coolant in the liquid cycle subsystem 14a and the air communicated through passage 42 cools the liquid removes heat from the load 48 and heats the air exiting the first air-liquid heat exchanger 44.

Dehumidified heated air exits the first air-liquid heat exchanger 44 through a passage 50 which communicates with the first turbine 22. The air is expanded through the first turbine of the ACM 26 between an inlet pressure of the first turbine 22 and an outlet pressure of the second turbine 24. The first turbine 22 also assists in condensing any water vapor which may still be in the air as a result of the air being expanded and thus cooled.

The recovered heat from the first air-liquid heat exchanger 44 is used by the first turbine 22, for example, to increase its rotating speed, boost its pressure ratio, increase its power and increase the expansion of the reheated air. Further, the first turbine 22 is mechanically engaged to the compressor 20 and the second turbine 24. Thus, heat or energy absorbed by the first turbine 22 is further converted to useful energy by the compressor 20.

The discharge pressure from the first turbine 22 is maintained at a discharge temperature just above freezing (mid-pressure) so that the first turbine 22 outlet air which passes through a passage 52 operates as a heat sink for the condenser 38 and the reheater 34. That Heated air exits the reheater 34 through a passage 54 which communicates with the second turbine 24. The recovered heat from the condenser 38 and the reheater 34 is used by the second turbine 24, for example, to increase its rotating speed, boost its pressure ratio, increase its power and increase the expansion of the reheated air. Thus, the performance of both turbines 22, 24 is improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 is maintained at a discharge temperature just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14b to form a heat exchange relationship therebetween.

The liquid cycle subsystem 14b, is a closed system as described above. The liquid coolant of the liquid cycle subsystem 14b is cycled by a pump 60 and functions as a coolant medium for a second heat load 62. An operating temperature of the second heat load 62 is lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14b and the air communicated through passage 56 cools the liquid, removes heat from the load 62 and heats the air exiting the second air-liquid heat exchanger 58. The relatively warmer air exits second air-liquid heat exchanger 58 through a passage 64 which communicates with cockpit 66 and/or other air loads 68 to provide cooling air therefor.

In the event that it is desired to modulate the supply from the first turbine 22, second turbine 24, cockpit 66 and/or the air loads 68, a temperature control passage 70, 72 communicates directly with bleed air 11 prior and/or subsequent to the primary heat exchanger 16. Control valves 74 are located just downstream of the first turbine 22 and the second turbine 24, and just upstream of the cockpit 66 and/or the air loads 68 to allow warm air mixture therewith. Operation of such control valves may be implemented by a microprocessor based electronic control system (either digital or analog; not shown).

The primary heat exchanger 16 and the secondary heat exchanger 30 include a respective primary RAM air fan (RAF) system 76 and a secondary RAM air fan (RAF) system 78. Notably, the RAFs 76,78 are located downstream of the respective heat exchangers 16, 30 in the RAM exhaust (illustrated schematically by arrows Ep, Es) such that temperature rise across the RAFs 76, 78 will not effect ECS performance. Each RAF 76, 78 includes an electric motor 80,82 such that each RAF 76, 78 is driven at a speed independent of the ACM 26 which reduces generated noise and increases overall operating efficiency. Furthermore, as each RAF 76, 78 is driven by the independent RAF electric motors 80, 82 the RAF 76, 78 are installed in the ECS systems 10 as self contained systems such as Line Replaceable Units (LRUs) which simplifies maintenance, improves reliability and performance while decreasing system weight.

Figure 2:
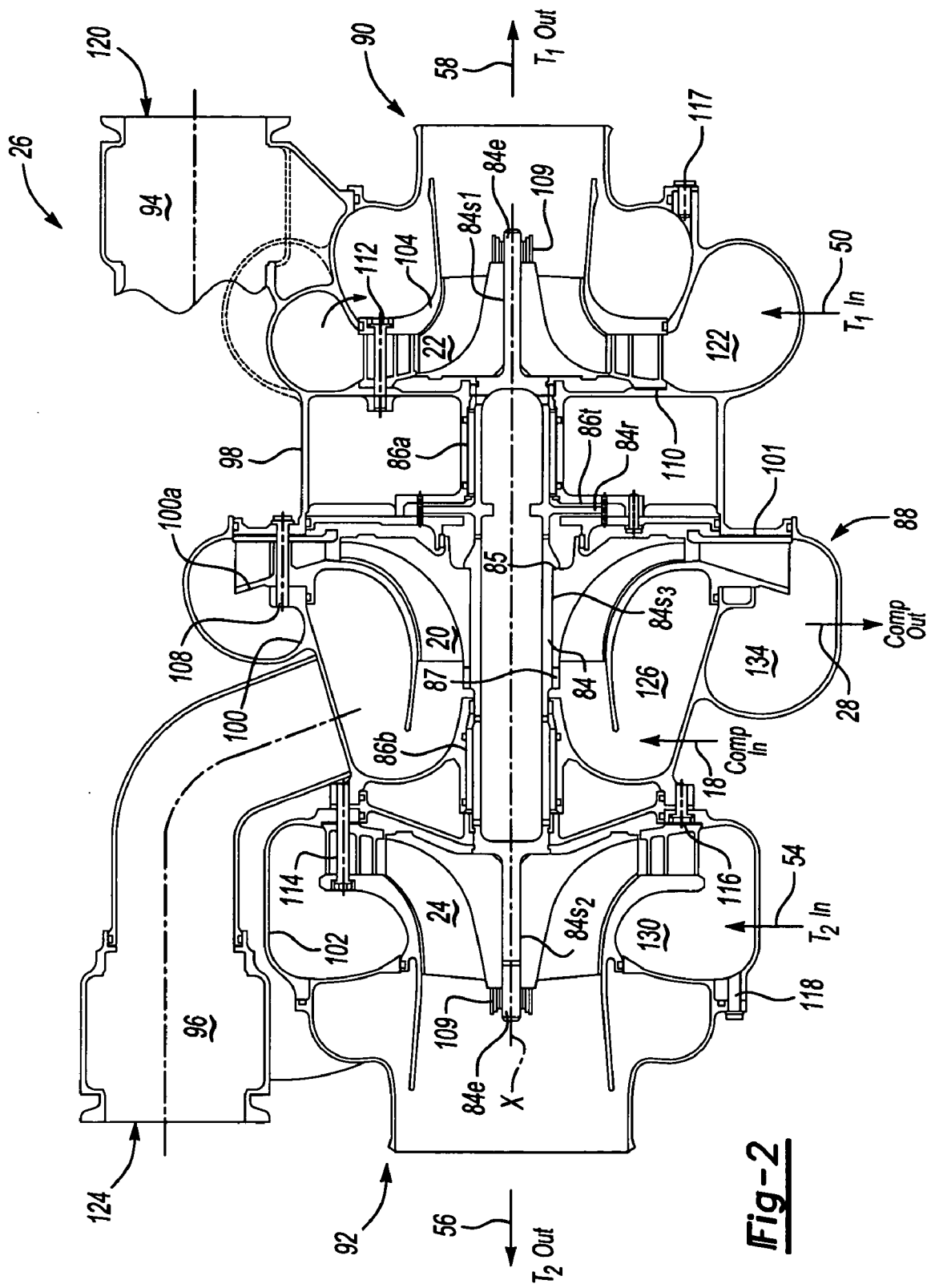
FIG. 2 is a sectional view of an ACM.

Referring to FIG. 2, the ACM 26 locates the compressor 20 upon a common shaft 84 between the first turbine 22 and the second turbine 24 for rotation about an axis of rotation X. The shaft 84 is supported on hydrodynamic foil bearings 86a, 86b, 86t which are reacted by an ACM housing 88. Locating the turbines 22, 24 outboard on each end of the ACM 26 is achieved by removing the RAFs 76, 78 from the ACM 26 and locating the RAFs 76, 78 elsewhere in the ECS system 10 (FIG. 1). Also, as the compressor 20 is located between the turbines 22, 24, the bypass circuits 94, 96 which communicate with the turbines 22, 24 are less circuitous and more efficient.

This use of the outboard-located turbines 22, 24 results in the highest efficiency possible with each turbine using a straight axial outlet diffuser 90, 92. Applicant has obtained flange-to-flange turbine efficiencies for a relatively large outboard-located axial-discharge turbine of up to 90 percent. The ACM 26 disclosed in the present invention provides twice the benefit resulting in better performance and overall lower system weight.

The ACM housing assembly 88 is manufactured of a multiple of housing portions to provide a desired clearance for the compressor 20 and the turbines 22, 24. Preferably, the ACM housing assembly 88 includes a first turbine housing portion 98, a compressor housing portion 100, a second turbine housing portion 102, a first turbine outlet portion 104 and a second turbine outlet 106 portion (also illustrated in FIG. 3).

A multiple of first turbine portion fasteners 108 (one shown) attaches the first turbine housing portion 98 to the compressor housing 100. An annular compressor shim 101 positions the first turbine housing portion 98 relative to the compressor housing 100 to provide a desired clearance for the compressor 20 and accommodate manufacturing variations in the housing portions 98, 100. The first turbine portion fasteners 108 threads through an inner compressor housing portion 100a which closely mates with the compressor 20.

The hydrodynamic foil bearings 86a supports the shaft 84 within the first turbine housing portion 98. The hydrodynamic foil bearing 86b supports the shaft 84 within the compressor housing portion 100. A hydrodynamic foil thrust bearing 86t is located between a radially extending shaft flange portion 84r which extends radially between the first turbine housing portion 98 and the compressor housing portion 100. Shaft fasteners 109 attach to threaded shaft ends 84e to retain the turbines 22, 24 to the shaft 84 through a respective splined interface 84s1 84s2. The compressor 20 engages the shaft 84 through a splined interface 84s3 and is axially retained adjacent a shaft stop 85 and a lock ring 87

An annular first turbine outlet shim 110 and a multiple of first turbine outlet fasteners 112 (one shown) positions the first turbine outlet portion 104 relative to the first turbine 22 to provide a desired clearance and accommodate variations in the housing portions 98, 104. The diffuser outlet 90 is mounted to the first turbine outlet portion 104 with a multiple of first turbine diffuser fasteners 117.

A multiple of second turbine portion fasteners 114 (one shown) attaches the second turbine housing portion 102 to the compressor housing 100. An annular shim 116 positions the second turbine outlet portion 106 relative to the second turbine 24 to provide a desired clearance and accommodate variations in the housing portions 106, 100. The fasteners 108, 114 are threaded into the compressor housing portion 100. The second turbine diffuser outlet 92 is attached to the second turbine outlet portion 106 with a multiple of second turbine outlet fasteners 118.

Figure 3:
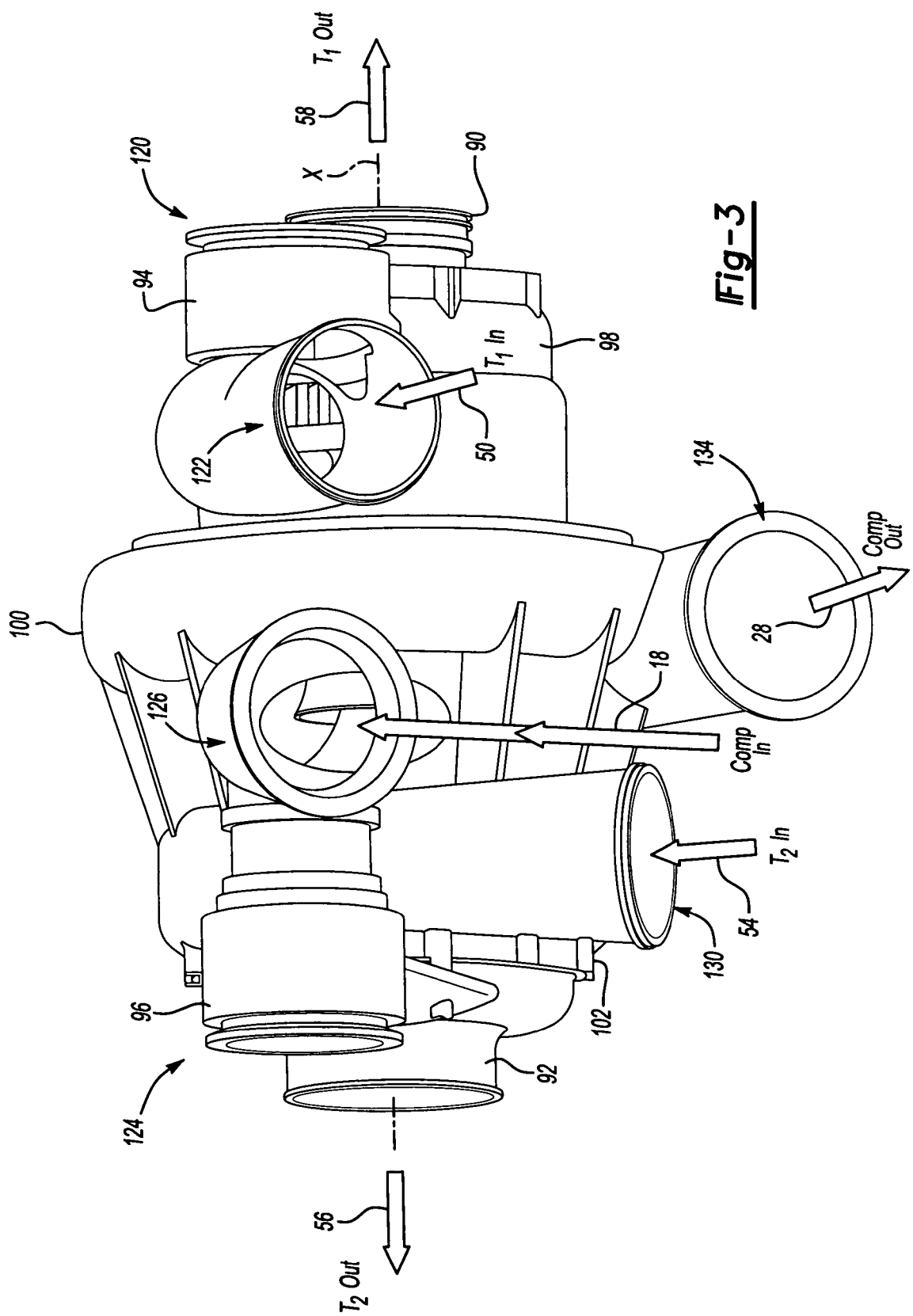
FIG. 3 is a perspective view of an ACM.

Referring to FIG. 3, a low limit bypass valve port 120 directly communicates with a first turbine inlet 122. An auxiliary ground unit (AGU) bypass valve port 124 directly communicates with a compressor inlet 126. By combining the integral valve ports into the ACM 26 with the simplified bypass circuits, a lightweight, high efficiency design is obtained.

The first turbine inlet 122, a second turbine inlet 130 and the compressor inlet 126 are at least partially wound around the ACM axis X. That is, the first turbine inlet 122, the second turbine inlet 130 and the compressor inlet 126 are formed into the respective housing portions to smoothly direct airflow in a tangential path toward the respective first turbine 22, the second turbine 24 and the compressor 20 (also illustrated in FIG. 2). A compressor outlet 134 also extends at least partially around the compressor housing portion to smoothly direct airflow out of the compressor 20 in a tangential direction. The compressor inlet 126 and the compressor outlet 134 are directed in a common direction to provide for a compact ACM packaging arrangement. The addition of integral valve ports into the ACM 26 hosing portions also results in a weight reduced design due to increase bypass efficiencies and simplified installations.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An Environmental Control System comprising:
an air cycle machine housing assembly;
a housing assembly having a first turbine housing portion, a second turbine housing portion, and a compressor housing portion;
a shaft mounted for rotation about an axis of rotation;
a hydrodynamic foil bearing which rotationally supports said shaft;
a first turbine mounted to said shaft, said first turbine communicating with a first turbine outlet along said axis of rotation, said first turbine outlet define by said first turbine housing portion;
a second turbine mounted to said shaft, said second turbine communicating with a second turbine outlet along said axis of rotation, said second turbine outlet axially opposite said first turbine, said first turbine outlet define by said first turbine housing portion;
a compressor upstream of said first turbine and said second turbine, said compressor mounted to said shaft between said first turbine and said second turbine, said compressor in communication with a compressor inlet and a compressor outlet located between said first turbine outlet and said second turbine outlet, said compressor inlet and said compressor outlet directed in a radial direction
an annular compressor shim between said first turbine housing portion and said compressor housing portion to provide a desired clearance for said compressor;
an annular first turbine outlet shim between said first turbine housing portion and said first turbine outlet to provide a desired clearance for said first turbine; and
an annular second turbine outlet shim between second turbine housing portion and said second turbine outlet to provide a desired clearance for said second turbine.

2. The System as recited in claim 1, further comprising a low limit valve port in communication with a first turbine inlet.

3. The System as recited in claim 1, further comprising an auxiliary ground unit bypass port in communication with a compressor inlet.

4. The System as recited in claim 1, wherein said shaft includes a radial flange which extends between said first turbine housing portion and said compressor housing portion.

5. The System as recited in claim 4, further comprising a hydrodynamic foil thrust bearing adjacent said radial flange.

6. The System as recited in claim 1, wherein said first turbine inlet, said second turbine inlet and said compressor inlet are at least partially wound around said housing assembly.

7. The System as recited in claim 1, wherein said compressor inlet and said compressor outlet are directed in a generally common radial direction.

* * * * *